US012623729B2

(12) United States Patent　　　　(10) Patent No.:　US 12,623,729 B2

Prior et al.　　　　　　　　　　　　(45) Date of Patent:　　May 12, 2026

(54) VEHICLE TAILGATE WITH SHINGLED DOOR SUBASSEMBLY

(71) Applicant: Ford Global Technologies, LLC, Dearborn, MI (US)

(72) Inventors: Joseph Prior, Detroit, MI (US); Joshua Robert Hemphill, White Lake, MI (US); Raul Ezequiel Alvarez Ruiz, Estado de Mexico (MX); Michael Shawn Watterworth, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 18/482,208

(22) Filed: Oct. 6, 2023

(65) Prior Publication Data

US 2025/0115308 A1　　Apr. 10, 2025

(51) Int. Cl.
B62D 33/00　　　(2006.01)
B62D 33/027　　(2006.01)

(52) U.S. Cl.
CPC ............................... B62D 33/0273 (2013.01)

(58) Field of Classification Search
CPC . B62D 33/0273; B62D 33/027; B62D 33/023
USPC ......................................................... 296/50
See application file for complete search history.

(56) References Cited

U.S. PATENT DOCUMENTS

| | | | | |
|---|---|---|---|---|
| 3,578,749 | A * | 5/1971 | Woten ................ | B62D 33/0273 296/57.1 |
| 5,664,822 | A | 9/1997 | Rosenfield | |
| 6,502,885 | B1 * | 1/2003 | Gammon .................. | B60R 7/02 224/511 |
| 8,246,098 | B2 * | 8/2012 | Cheung .............. | B62D 33/0273 296/146.12 |
| 8,740,279 | B1 | 6/2014 | McGoff et al. | |
| 9,944,333 | B1 | 4/2018 | Stojkovic et al. | |
| 11,584,203 | B2 * | 2/2023 | Nania ........................ | B60R 3/02 |
| 12,371,935 | B1 * | 7/2025 | Miller .................. | B62D 33/037 |
| 2002/0089227 | A1 | 7/2002 | Speraw et al. | |
| 2003/0146638 | A1 | 8/2003 | Clare | |
| 2009/0183433 | A1 | 7/2009 | Cheung et al. | |
| 2012/0324793 | A1 * | 12/2012 | Abbasi ............... | B62D 33/0273 49/168 |
| 2016/0200375 | A1 | 7/2016 | Kerr, III | |
| 2016/0200376 | A1 | 7/2016 | Kerr, III | |
| 2016/0347262 | A1 | 12/2016 | Goldstein et al. | |
| 2019/0193538 | A1 | 6/2019 | Carter et al. | |
| 2019/0301210 | A1 | 10/2019 | Shoopman | |
| 2022/0154514 | A1 | 5/2022 | Rosales | |

* cited by examiner

*Primary Examiner* — Steven O Douglas
(74) *Attorney, Agent, or Firm* — Vichit Chea; Carlson, Gaskey & Olds, P.C.

(57)　　　　　　ABSTRACT

A vehicle assembly includes a frame subassembly of a tailgate. The frame subassembly has a cargo bed access opening between a first outboard section and a second outboard section. The assembly further includes a door subassembly of the tailgate. The door subassembly is pivotably coupled to the frame subassembly. The door subassembly is pivotable relative to the frame subassembly back-and-forth between a door open position and a door closed position. When the door subassembly is in the door closed position, the door subassembly closes the cargo bed access opening and is shingled relative to the frame subassembly.

16 Claims, 4 Drawing Sheets

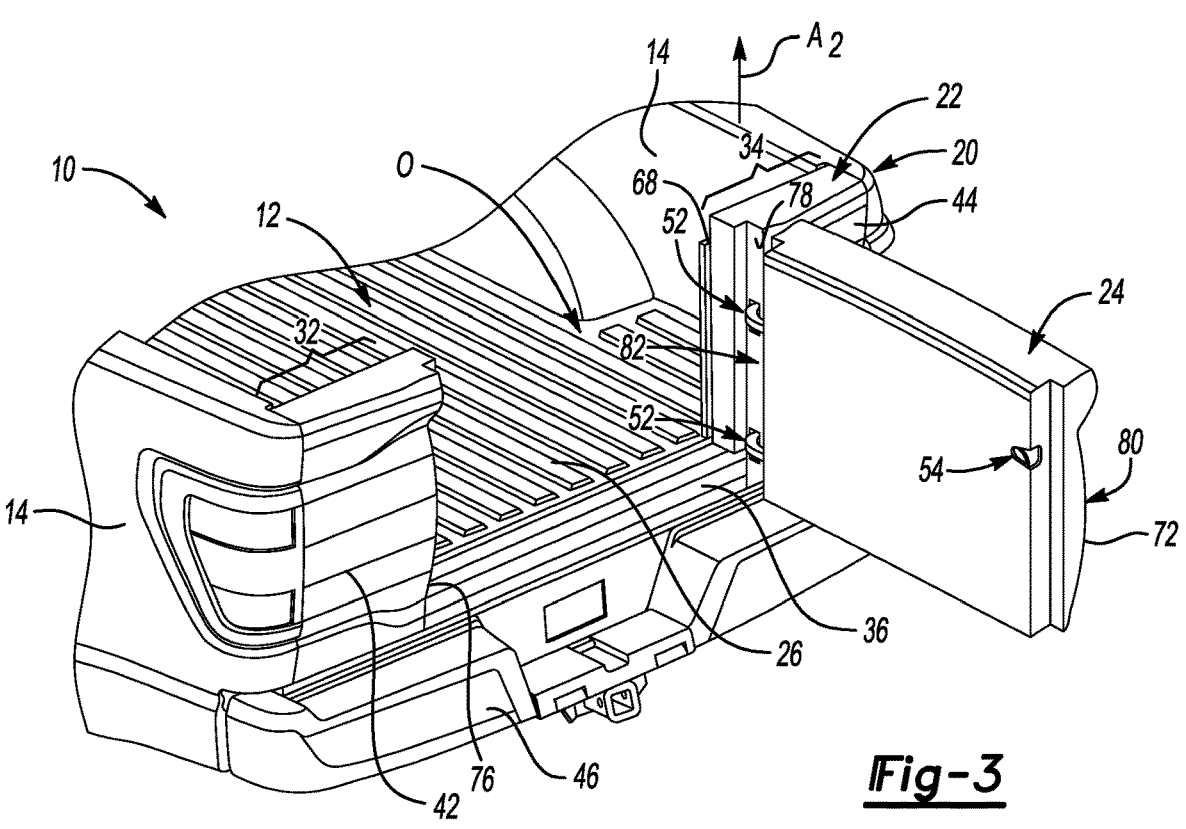
_Fig-3_
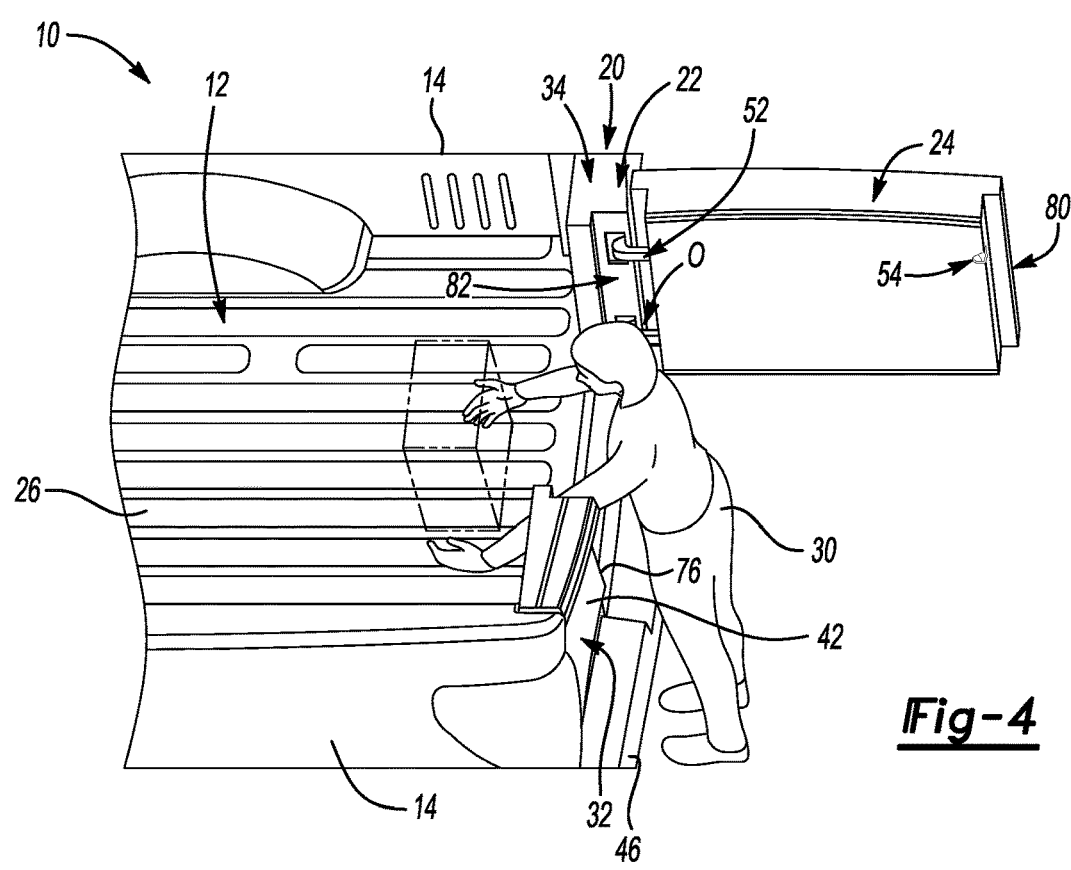
_Fig-4_

VEHICLE TAILGATE WITH SHINGLED DOOR SUBASSEMBLY

TECHNICAL FIELD

This disclosure relates generally to a tailgate of a vehicle and, more particularly, to a tailgate having door subassembly shingled relative to a frame subassembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable to an open position to provide access to the cargo bed.

SUMMARY

In some aspects, the techniques described herein relate to a vehicle assembly, including: a frame subassembly of a tailgate, the frame subassembly having a cargo bed access opening between a first outboard section and a second outboard section; and a door subassembly of the tailgate, the door subassembly pivotably coupled to the frame subassembly, the door subassembly pivotable relative to the frame subassembly back-and-forth between a door open position and a door closed position, when the door subassembly is in the door closed position, the door subassembly closes the cargo bed access opening and is shingled relative to the frame subassembly.

In some aspects, the techniques described herein relate to a vehicle assembly, wherein the frame subassembly and the door subassembly pivot together about a horizontally extending axis, wherein the door subassembly pivots relative to the frame subassembly about a vertically extending axis.

In some aspects, the techniques described herein relate to a vehicle assembly, wherein the first outboard section is on a driver side of the cargo bed access opening of the cargo bed access opening, and the second outboard section is on a passenger side of the cargo bed access opening.

In some aspects, the techniques described herein relate to a vehicle assembly, wherein, when the door subassembly is in the door closed position, an inboard-most edge of the first outboard section is inboard an outboard-most edge of the door subassembly.

In some aspects, the techniques described herein relate to a vehicle assembly, wherein, when the tailgate is in a tailgate closed position, a vertically extending split line between the door subassembly and the first outboard section on a forward facing side of the tailgate is inboard both an inboard hemmed edge of the first outboard section and an outboard hemmed edge of the door subassembly.

In some aspects, the techniques described herein relate to a vehicle assembly, wherein the inboard hemmed edge of the first outboard section is an inboard hemmed edge of an outer panel of the first outboard section.

In some aspects, the techniques described herein relate to a vehicle assembly, wherein, when the tailgate is in the tailgate closed position, the inboard hemmed edge of the first outboard section and the outboard hemmed edge of the door subassembly are both aft a shut-face of the door subassembly.

In some aspects, the techniques described herein relate to a vehicle assembly, wherein, when the tailgate is in a tailgate closed position, an inboard hemmed edge of the first outboard section is horizontally overlapped with an outboard hemmed edge of the door subassembly.

In some aspects, the techniques described herein relate to a vehicle assembly, wherein, when the tailgate is in a tailgate closed position, an inboard-most edge of the first outboard section is forward a shut-face of the door subassembly, and an outboard-most edge of the door subassembly is aft the shut-face of the door subassembly.

In some aspects, the techniques described herein relate to a vehicle assembly, wherein, when the tailgate is in a tailgate closed position, the inboard-most edge of the first outboard section is inboard the shut-face of the door subassembly, and the outboard-most edge of the door subassembly is outboard the shut-face of the door subassembly.

In some aspects, the techniques described herein relate to a vehicle assembly, wherein, when the tailgate is in a tailgate closed position, a vertically extending split line between the door subassembly and the first outboard section on a forward facing side of the tailgate is inboard a vertically extending split line between the door subassembly and the first outboard section on a rearward facing side of the tailgate.

In some aspects, the techniques described herein relate to a vehicle assembly, further including a material shield that covers the vertically extending split line between the door subassembly and the first outboard section when the tailgate is in the tailgate closed position.

In some aspects, the techniques described herein relate to a vehicle assembly, wherein the door subassembly and the frame subassembly are pivotable together about a first axis between a tailgate closed position and a tailgate open position, wherein the door subassembly is pivotable relative to the frame subassembly about a second axis between a door closed position and a door open position, the first axis transverse to the second axis.

In some aspects, the techniques described herein relate to a vehicle assembly, wherein, when the door subassembly is in the door open position, the cargo bed access opening extends vertically downward at least as far as a vertically bottommost side of an outer panel of the first outboard section and an outer panel of the second outboard section.

In some aspects, the techniques described herein relate to a vehicle assembly, wherein the cargo bed access opening extends vertically downward at least as far as a floor of a cargo bed.

In some aspects, the techniques described herein relate to a method of shingling areas of a tailgate, including: providing a tailgate that includes a door subassembly pivotably coupled to a frame subassembly, the door subassembly and the frame subassembly pivotable together between a tailgate closed position and a tailgate open position; pivoting the door subassembly relative to the frame subassembly from a door closed position to a door open position to provide a cargo bed access opening, the door subassembly disposed between a first outboard section and a second outboard section of the frame subassembly when the door subassembly is in the door closed position; and shingling the door subassembly relative to the frame subassembly when the door subassembly is in the door closed position and closes the cargo bed access opening.

In some aspects, the techniques described herein relate to a method, further including shingling the door subassembly relative to the frame subassembly by positioning an inboard edge of the first outboard section inboard of an outboard edge of the door subassembly when the door subassembly is in the door closed position.

In some aspects, the techniques described herein relate to a method, further including shingling by, when the tailgate is in the tailgate closed position, horizontally offsetting a vertically extending split line between the door subassembly and the first outboard section on a forward facing side of the tailgate from a vertically extending split line between the door subassembly and the first outboard section on a rearward facing side of the tailgate.

In some aspects, the techniques described herein relate to a method, wherein the vertically extending split line on the rearward facing side of the tailgate is provided by a hemmed inboard edge of the first outboard section and a hemmed outboard edge of the door subassembly.

BRIEF DESCRIPTION OF THE DRAWINGS

The various features and advantages of this disclosure will become apparent to those skilled in the art from the following detailed description. The drawings that accompany the detailed description can be briefly described as follows.

FIG. 3 illustrates the motor vehicle of FIG. 1 with a door subassembly of the tailgate assembly in a door open position relative to a frame subassembly of the tailgate assembly.

FIG. 4 illustrates an overhead view of the tailgate assembly in the position of FIG. 3.

DETAILED DESCRIPTION

Figure 1:
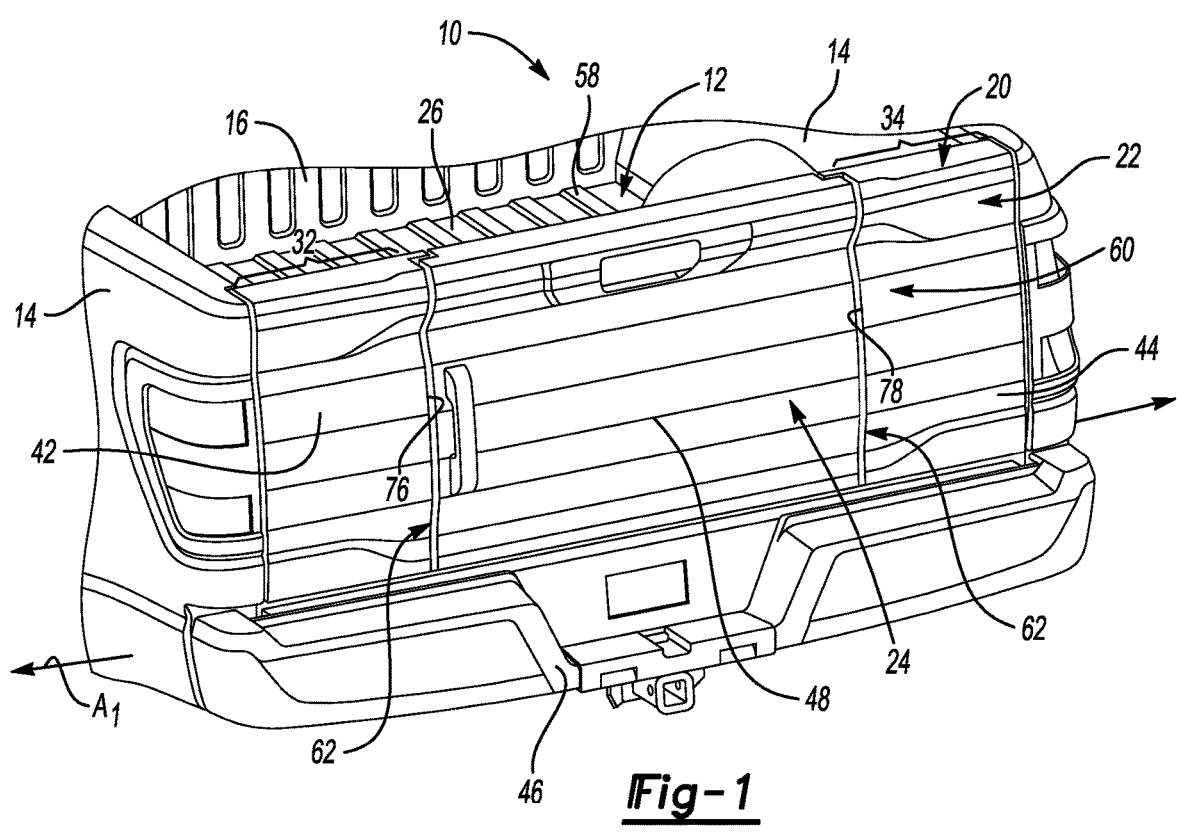
FIG. 1 is a rear perspective view of a motor vehicle equipped with a cargo space and having a tailgate assembly in a tailgate closed position relative to the cargo space.
Figure 2:
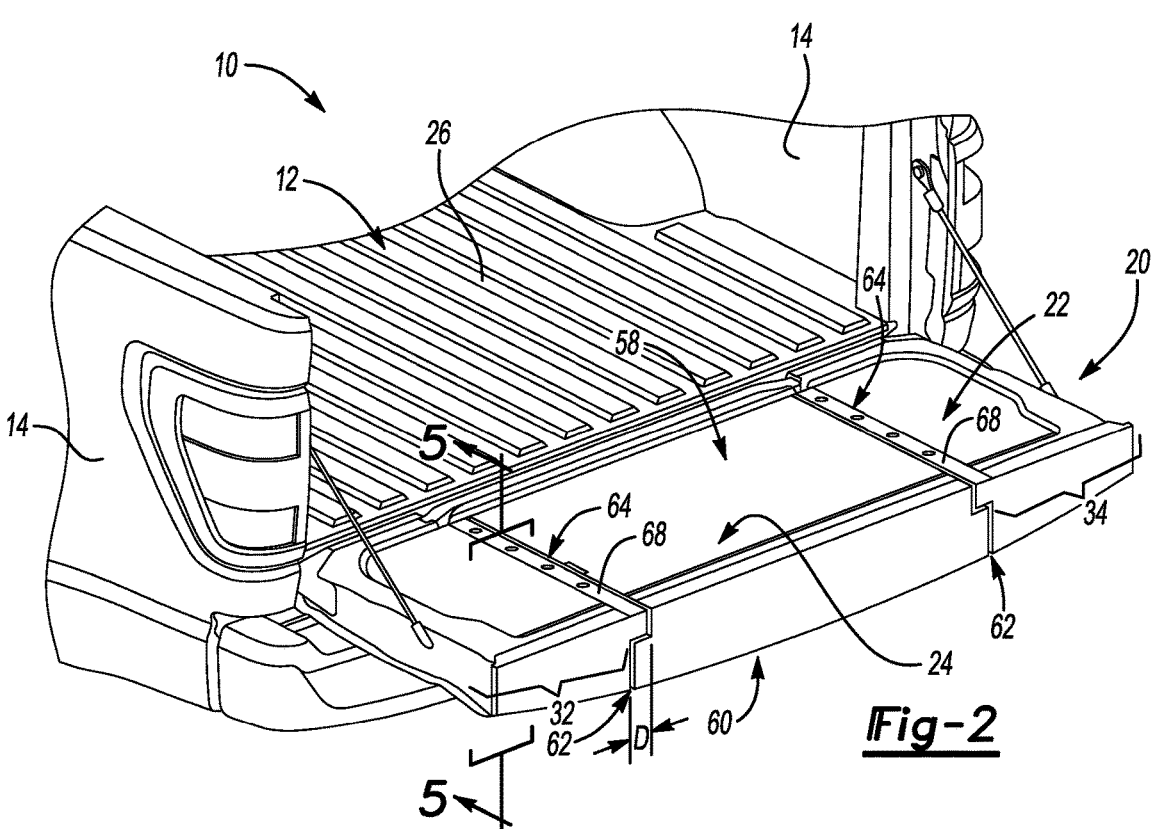
FIG. 2 illustrates the motor vehicle of FIG. 1 with the tailgate assembly in a tailgate open position.

This disclosure details a tailgate assembly having a frame subassembly and a door subassembly. The door subassembly can be opened to provide an opening that, among other things, helps a user to access cargo within a cargo bed. The door subassembly can be shingled relative to the frame subassembly to enhance aesthetics and to block material from entering areas between the door subassembly and the frame subassembly.

With reference to FIGS. 1-4, a vehicle 10, according to an exemplary aspect of the present disclosure, is a pickup truck. The vehicle 10 has a cargo bed 12 that is provided by a pair of sidewalls 14, a front wall 16, and a tailgate assembly 20. The cargo bed 12 can hold various types of cargo, including material, such as mulch, rocks, dirt, etc.

The tailgate assembly 20 includes, among other things, a frame subassembly 22 and a door subassembly 24. The tailgate assembly 20 is pivotable about a first axis $A_1$ relative to the cargo bed 12 between a tailgate closed position shown in FIG. 1 and a tailgate open position shown in FIG. 2. The example tailgate assembly 20 is vertically aligned when in the tailgate closed position and horizontally aligned when in the tailgate open position. Vertical and horizontal, for purposes of this disclosure, are with reference to ground and an ordinary orientation of the vehicle 10 during operation.

The door subassembly 24 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together when the tailgate assembly 20 is pivoted between the tailgate closed position and the tailgate open position.

When the tailgate assembly 20 is in the tailgate closed position, the door subassembly 24 is pivotable relative to the frame subassembly 22 about a second axis $A_2$. The door subassembly 24 can pivot back-and-forth between a door closed position shown in FIG. 1 and a door open position shown in FIGS. 3 and 4. The first axis $A_1$ is a horizontally extending axis in this example. The second axis $A_2$ is transverse to the first axis $A_1$ and is a vertically extending axis in this example. Horizontal and vertical are, for purposes of this disclosure, with reference to ground and a general orientation of the vehicle 10 during ordinary operation.

The door subassembly 24 in the door open position provides a cargo bed access opening O. In this example, the cargo bed access opening O extends vertically downward at least as far as a floor 26 of the cargo bed 12.

As shown in FIG. 4, a user 30 can access the cargo bed 12 through the cargo bed access opening O provided when the door subassembly 24 in the door open position. Placing the door subassembly 24 in the door open position allows the user 30 to move closer to the cargo bed 12 than, for example, if the tailgate assembly 20 were moved to the tailgate open position of FIG. 2. The cargo bed access opening O can also provide clearance for the user 30 to enter the cargo bed 12 to load or retrieve cargo.

The frame subassembly 22 includes, among other things, a first outboard section 32, a second outboard section 34, and a connection member 36. The first outboard section 32, the second outboard section 34, and the connection member 36 pivot together when the frame subassembly 22 is moved between the tailgate closed position and the tailgate open position. A portion of the connection member 36 can dip vertically downward to keep the connection member 36 below the floor 26 of the cargo bed 12.

The first outboard section 32 includes an outer panel 42, and the second outboard section 34 includes an outer panel 44. When the tailgate assembly 20 is in the tailgate closed position of FIG. 1, the outer panels 42 and 44 can be viewed by an individual standing behind the vehicle 10. The connection member 36, however, is concealed from view behind a bumper 46 or a fascia for example.

The door subassembly 24 includes an outer panel 48 that is also visible to a user when the tailgate assembly 20 is in the tailgate closed position of FIG. 1. When the door subassembly 24 is in the door closed position, the outer panel 48 of the door subassembly 24 separates the outer panel 42 of the first outboard section 32 from all portions of the outer panel 44 of the second outboard section 34. When the door subassembly 24 is in the door open position, the cargo bed access opening O extends vertically downward at least as far as the vertically bottommost sides of the outer panel 42 of the first outboard section 32 and the outer panel 44 of the second outboard section 34.

Notably, no portion of the outer panel 42 or the outer panel 44 horizontally overlaps with the outer panel 48 of the door subassembly 24. That is, the outer panel 42 of the first outboard section 32 does not include a section extending vertically beneath the outer panel 48 of the door subassembly 24, and the outer panel 44 of the second outboard section 34 does not include a section extending vertically beneath the outer panel 48 of the door subassembly 24.

The door subassembly 24 is pivotally coupled to the frame subassembly 22 through a hinge system that includes, in this example, two hinges 52. In this example, the door subassembly 24 is pivotally coupled to the second outboard section 34. In another example, the door subassembly 24 is pivotally coupled to the first outboard section 32.

The hinges 52 are gooseneck hinges in this example. The hinges 52 permit the door subassembly 24 to pivot relative to the frame subassembly 22, and to pivot well away from the cargo bed access opening O. The hinges 52 can include two door check positions, say at forty-five and ninety degrees. The door subassembly 24 can pivot one-hundred degrees when transitioned from the closed door position to a fully open door position.

When the door subassembly 24 is in the door closed position, a latch system is used to secure the door subassembly 24 to the frame subassembly 22. The example latch system includes at least one upper latch 54 that engages a striker mounted to the first outboard section 32 to hold the door subassembly 24 in the door closed position.

When the tailgate assembly 20 is in the tailgate closed position of FIG. 1, the tailgate assembly 20 includes a forward facing side 58 and a rearward facing side 60. The door subassembly 24 is incorporated into the tailgate assembly 20 between the first outboard section 32 and the second outboard section 34 such that the door subassembly 24 is shingled relative to the frame subassembly 22.

In particular, the outer panel 48 of the door subassembly 24 is separated from the outer panel 42 of the first outboard section 32 and the outer panel 44 of the second outboard section 34 with respective split lines 62 that extend vertically from a bottom of the tailgate assembly 20 to a top of the tailgate assembly 20 on the rearward facing side 60. On the forward facing side 58, the door subassembly 24 is separated from the first outboard section 32 and the second outboard section 34 with respective split lines 64 that extend vertically from a bottom of the tailgate assembly 20 to a top of the tailgate assembly 20. The split lines 64 are each offset a distance D inboard from the respective split lines 62. Due to the offset, the example door subassembly 24 is shingled relative to the frame subassembly 22.

The example tailgate assembly 20 includes material shields 68 disposed at an interface 118 between the door subassembly and the frame subassembly. The material shields 68 cover the split lines 64 to block material from moving into gaps between the door subassembly 24 and the first outboard section 32, and gaps between the door subassembly 24 and the second outboard section 34. The material can be, for example, mulch, stone, construction materials, leaves, etc. The material shields 68 can be a rubber material, such as ethylene propylene rubber.

Figure 5:
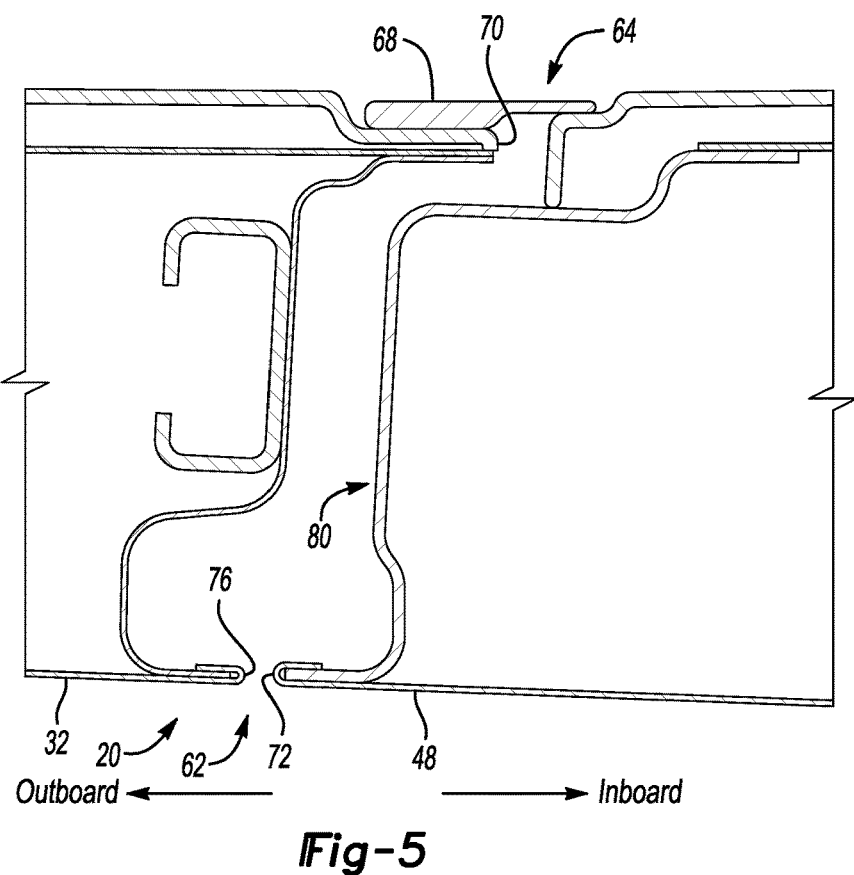
FIG. 5 illustrates a section view at line 5-5 in FIG. 2 showing an example embodiment of the door subassembly being shingled relative to the frame subassembly.

Referring to FIG. 5 with continuing reference to FIGS. 1-4, when the door subassembly 24 is in the door closed position, an inboard-most edge 70 of the first outboard section 32 extends inboard past an outboard-most edge 72 of the door subassembly 24. This offsets the split lines 62 and 64 to conceal gaps and mechanisms such as latches and strikers, particularly when the vehicle 10 is viewed from behind with the tailgate assembly 20 is in the tailgate closed position. The offset between the split lines 62 and 64 can further help to block material flowing into these areas.

In this example, the outboard-most edges 72 of the door subassembly 24 are hemmed edges of the outer panel 48 of the door subassembly 24. The outboard-most edges 72 interface, respectively, with a hemmed edge 76 that extends along an inboard side of the outer panel 42 of the first outboard section 32 and a hemmed edge 78 along an inboard side of the outer panel 44 of the second outboard section 34 to establish the split lines 62.

The split line 64 on the driver side of the tailgate assembly 20 is inboard the outboard-most edge 72 of the door subassembly 24 and inboard the hemmed edge 76 of the outer panel 42 of the first outboard section 32. The split line 64 on the passenger side is similarly positioned inboard of the outboard-most edge 72 of the door subassembly 24 and inboard the hemmed edge 78 along the inboard side of the outer panel 44 of the second outboard section 34.

The door subassembly 24 includes a driver side shut-face 80 and a passenger side shut-face 82. In this example, the outboard-most edges 72 of the door subassembly 24 are aft the driver side shut-face 80 and the passenger side shut-face 82 when the tailgate assembly 20 is in the tailgate closed position. The hemmed edge 76 of the outer panel 42 of the first outboard section 32 and the hemmed edge 78 of the outer panel 44 of the second outboard section 34 are also after of the driver side shut-face 80 and the passenger side shut-face 82

Figure 6:
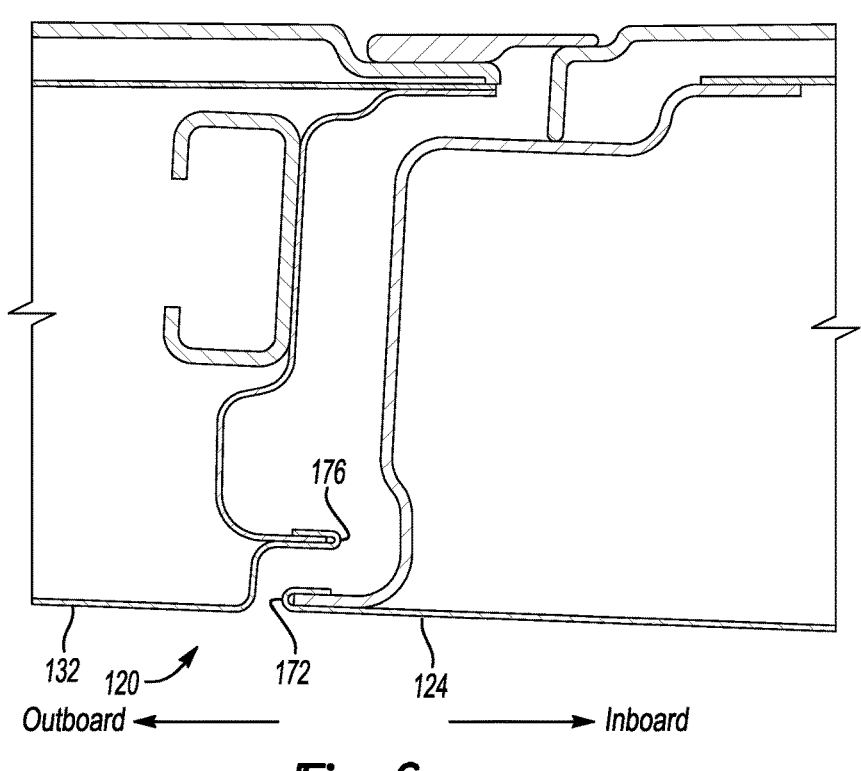
FIG. 6 illustrates a section view at the position of the section of FIG. 5, but taken through a tailgate assembly according to another exemplary embodiment of the present disclosure.

With reference to FIG. 6, in another example tailgate assembly 120, a hemmed edge 176 on an inboard side of a first outboard section 132 is horizontally overlapped with an outboard hemmed edge 172 of a door subassembly 124. The hemmed edge 176 is aft the outboard hemmed edge 172 when the example tailgate assembly 120 is in a tailgate closed position. In another example, the outboard hemmed edge 172 could be aft the hemmed edge 176.

Figure 7:
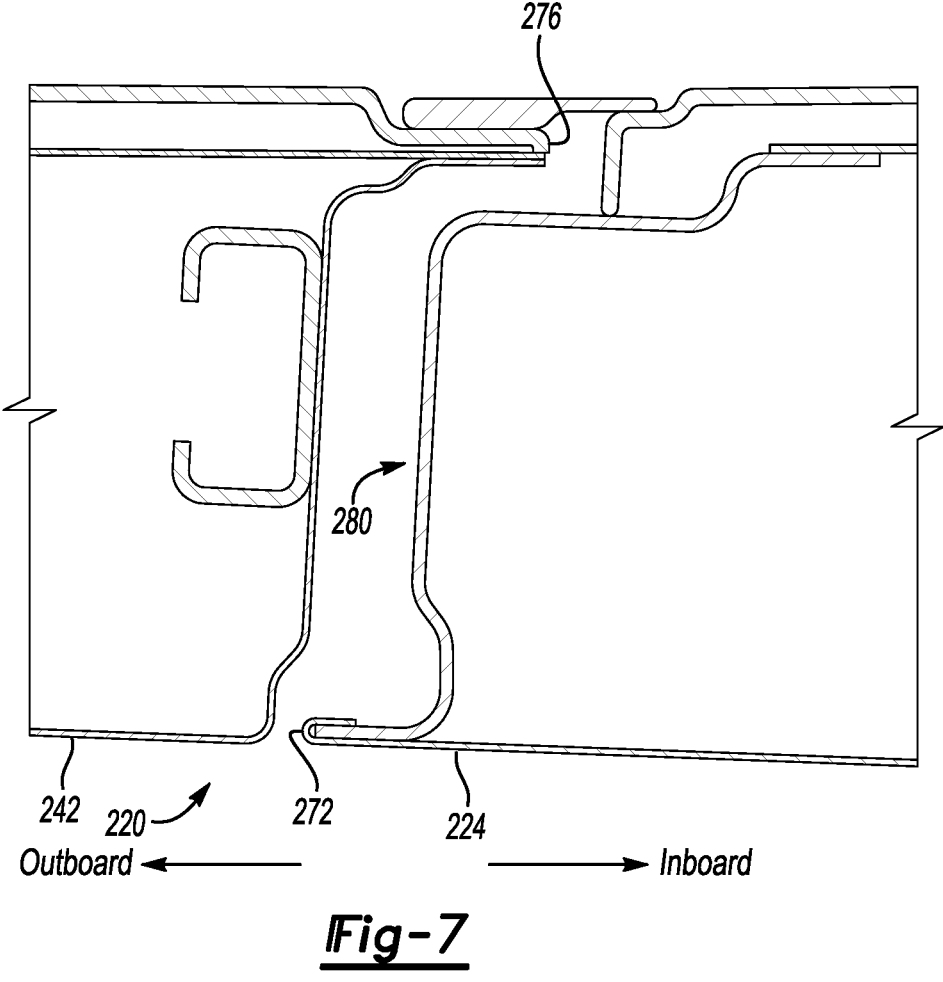
FIG. 7 illustrates a section view at the position of the section of FIG. 5, but taken through at tailgate assembly according to yet another exemplary embodiment of the present disclosure.

With reference to FIG. 7, in yet another example tailgate assembly 220, the outer panel 242 wraps forward such that an inboard-most edge 276 of the outer panel 242 of the first outboard section 232 is forward a shut-face 280 of the door subassembly 224. An outboard-most edge 272 of the door subassembly 224 is aft the shut-face 280 of the door subassembly 224. The inboard-most edge 276 of the first outboard section 232 is inboard the shut-face 280 of the door subassembly 224, and the outboard-most edge 272 of the door subassembly 224 is outboard the shut-face 280 of the door subassembly.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:
a frame subassembly of a tailgate, the frame subassembly having a cargo bed access opening between a first outboard section and a second outboard section; and
a door subassembly of the tailgate, the door subassembly pivotally coupled to the frame subassembly, the door subassembly pivotable relative to the frame subassembly back-and-forth between a door open position and a door closed position, when the door subassembly is in the door closed position, the door subassembly closes the cargo bed access opening and is shingled relative to the frame subassembly,
wherein, when the tailgate is in a tailgate closed position, an inboard hemmed edge of the first outboard section is horizontally overlapped with an outboard hemmed edge of the door subassembly.

2. The vehicle assembly of claim 1, wherein the frame subassembly and the door subassembly pivot together about a horizontally extending axis, wherein the door subassembly pivots relative to the frame subassembly about a vertically extending axis.

3. The vehicle assembly of claim 1, wherein the first outboard section is on a driver side of the cargo bed access opening, and the second outboard section is on a passenger side of the cargo bed access opening.

4. The vehicle assembly of claim 1, wherein, when the door subassembly is in the door closed position, an inboard-most edge of the first outboard section is inboard an outboard-most edge of the door subassembly.

5. A vehicle assembly, comprising:
a frame subassembly of a tailgate, the frame subassembly having a cargo bed access opening between a first outboard section and a second outboard section; and
a door subassembly of the tailgate, the door subassembly pivotably coupled to the frame subassembly, the door subassembly pivotable relative to the frame subassembly back-and-forth between a door open position and a door closed position, when the door subassembly is in the door closed position, the door subassembly closes the cargo bed access opening and is shingled relative to the frame subassembly,
wherein, when the tailgate is in a tailgate closed position, a vertically extending split line between the door subassembly and the first outboard section on a forward facing side of the tailgate is inboard both an inboard hemmed edge of the first outboard section and an outboard hemmed edge of the door subassembly.

6. The vehicle assembly of claim 5, wherein the inboard hemmed edge of the first outboard section is an inboard hemmed edge of an outer panel of the first outboard section.

7. The vehicle assembly of claim 5, wherein, when the tailgate is in the tailgate closed position, the inboard hemmed edge of the first outboard section and the outboard hemmed edge of the door subassembly are both aft a shut-face of the door subassembly.

8. The vehicle assembly of claim 1, wherein, when the tailgate is in a tailgate closed position, an inboard-most edge of the first outboard section is forward a shut-face of the door subassembly, and an outboard-most edge of the door subassembly is aft the shut-face of the door subassembly.

9. The vehicle assembly of claim 8, wherein, when the tailgate is in a tailgate closed position, the inboard-most edge of the first outboard section is inboard the shut-face of the door subassembly, and the outboard-most edge of the door subassembly is outboard the shut-face of the door subassembly.

10. The vehicle assembly of claim 1, wherein, when the tailgate is in a tailgate closed position, a vertically extending split line between the door subassembly and the first outboard section on a forward facing side of the tailgate is inboard a vertically extending split line between the door subassembly and the first outboard section on a rearward facing side of the tailgate.

11. The vehicle assembly of claim 10, further comprising a material shield that covers the vertically extending split line between the door subassembly and the first outboard section when the tailgate is in the tailgate closed position.

12. The vehicle assembly of claim 1, wherein the door subassembly and the frame subassembly are pivotable together about a first axis between a tailgate closed position and a tailgate open position, wherein the door subassembly is pivotable relative to the frame subassembly about a second axis between a door closed position and a door open position, the first axis transverse to the second axis.

13. The vehicle assembly of claim 12, wherein, when the door subassembly is in the door open position, the cargo bed access opening extends vertically downward at least as far as a vertically bottommost side of an outer panel of the first outboard section and an outer panel of the second outboard section.

14. The vehicle assembly of claim 1, wherein the cargo bed access opening extends vertically downward at least as far as a floor of a cargo bed.

15. A method of shingling areas of a tailgate, comprising:
providing a tailgate that includes a door subassembly pivotably coupled to a frame subassembly, the door subassembly and the frame subassembly pivotable together between a tailgate closed position and a tailgate open position;
pivoting the door subassembly relative to the frame subassembly from a door closed position to a door open position to provide a cargo bed access opening, the door subassembly disposed between a first outboard section and a second outboard section of the frame subassembly when the door subassembly is in the door closed position; and
shingling the door subassembly relative to the frame subassembly when the door subassembly is in the door closed position and closes the cargo bed access opening, the shingling including horizontally offsetting a vertically extending split line between the door subassembly and the first outboard section on a forward facing side of the tailgate from a vertically extending split line between the door subassembly and the first outboard section on a rearward facing side of the tailgate,
wherein the vertically extending split line on the rearward facing side of the tailgate is provided by a hemmed inboard edge of the first outboard section and a hemmed outboard edge of the door subassembly.

16. The method of claim 15, further comprising shingling the door subassembly relative to the frame subassembly by positioning an inboard edge of the first outboard section inboard of an outboard edge of the door subassembly when the door subassembly is in the door closed position.

* * * * *